N. JENKINS.
Soldering Apparatus.

No. 238,291. Patented March 1, 1881.

WITNESSES:
W. Colborne Brookes
W. C. Dey

INVENTOR:
Nicholas Jenkins,
BY F. L. Stetson
ATTORNEY.

UNITED STATES PATENT OFFICE.

NICHOLAS JENKINS, OF NEW HAVEN, CONNECTICUT.

SOLDERING APPARATUS.

SPECIFICATION forming part of Letters Patent No. 238,291, dated March 1, 1881.

Application filed February 20, 1880.

*To all whom it may concern:*

Be it known that I, NICHOLAS JENKINS, a citizen of the United States, residing in the city and county of New Haven, in the State of Connecticut, have invented certain new and useful Improvements Relating to Methods of and Apparatus for Soldering Braided Metal Springs and Analogous Articles, of which the following is a specification.

I manufacture a spring or stiffener possessing especially desirable qualities by braiding small wires, of steel or hard brass or analogous elastic metal, soldering the ends together, and capping over the soldered ends with a metal cap to form a smooth finish, which will not cut or injure the fabric in which it is held. I have devised machinery or apparatus for facilitating the several operations required.

The metal caps are compressed or flattened upon the wire spring by means of suitable dies, which allow them to take a firm hold. Heat may be applied to cause the solder to adhere to the caps, if desired in any case, but I have not found it necessary. The caps will be able to hold the wires in some cases without the soldering of the wires at all; but my means for effecting the soldering renders it easy and rapid to unite the wires by this means before the caps are applied. The caps and mode of applying them form no part of the present invention.

The spring may be used for a great variety of purposes.

The following is a description of what I consider the best means of carrying out the invention.

The accompanying drawings form a part of this specification.

Figure 1:
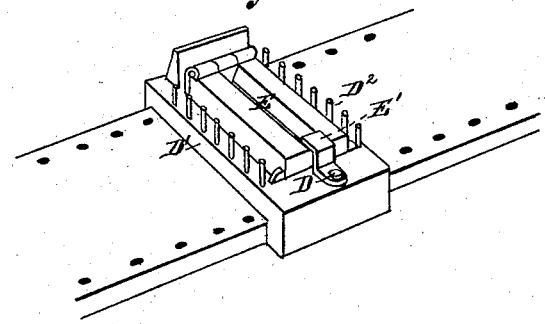
Figure 2:
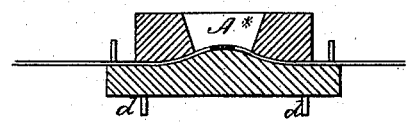
Figure 3:
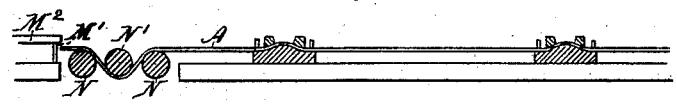
Figure 4:
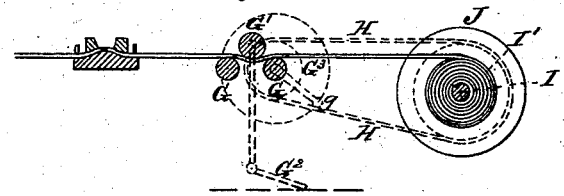
Figure 5:

Figure 1 is a perspective view of a portion of the apparatus which I employ in soldering the several wires together previous to cutting them. It will be understood that I braid the springs in lengths of some hundred feet, more or less, on a suitable machine adapted to produce flat braids, and apply solder, in small quantities, at the required distances apart, and then cut off the spring in the middle of each soldered point so as to leave each end of each spring soldered firmly together. Without this or some analogous mode of operation the labor of soldering would be serious, and the wires, by their highly elastic nature, would be liable to escape from confinement and spread apart before the solder could be effective. Fig. 2 is a section across one of the soldering-clamps in the plane of one of the springs. I adapt the apparatus to treat a number of springs at once. Fig. 3 is a section, on a smaller scale, showing the relation of the clamps to each other and to the straightening device, which serves, also, as a tension device, through which the springs are passed in entering the soldering apparatus. Fig. 4 shows the winding apparatus or winding parts which I employ to shift the springs ahead when the soldering at one series of points has been completed. Fig. 5 is a section, through a modified construction, having the end soldered and smoothly rounded by any suitable means without a cap.

Similar letters of reference indicate like parts in all the figures.

I have not deemed it necessary to represent the braiding machinery, which may be of the ordinary character employed in the manufacture of braid from fibrous yarns, with proper modifications to provide for the stiffeners of the wires, nor to represent the reels on which the lengths of braided wire are wound, nor the stands on which such reels are mounted in the vicinity of the soldering machine, arranged to deliver their respective springs side by side. The braiding-machine must be of the kind adapted to produce flat braid, or the braid, after its manufacture, must be flattened to produce a properly-flattened spring.

M is a bench or platform provided with guide-pins M' and a cross-bar, M², which guide a series of six or other convenient number of springs, A, proceeding from as many reels. (Not represented.)

N N are retarding-rollers turning in stationary bearings.

N' is a roller mounted in bearings (not shown) which are capable of rising and sinking, and may be loaded by a weight. (Not represented.) The springs A are passed over the rollers N and under the roller N'. The facility for raising and lowering aids in the insertion of the springs, and also accommodates any irregularity in the several springs. The passage through this apparatus induces a resistance, which is useful in attaining the proper tension on the springs, and also aids in flattening and straightening the springs.

D D are plates of cast-iron mounted transversely on the bench M. They are set at distances apart corresponding to the lengths of the springs desired. The bench M is provided with holes, and each plate D is provided with pins $d$, adapted to match in the holes by lifting a plate D and moving it so that its pins $d$ will match in different holes. The lengths of the springs may be varied at will. Each plate D is provided with short uprights or teeth D' on the side which receives the springs, and with corresponding teeth $D^2$ on the side which discharges them. They serve as guides, and insure that the springs, as they are intermittently moved through the machine, shall be kept properly apart.

E E are top pieces, of cast-iron, hinged to the respective plates D. They are held down upon the springs by their gravity, and also by a turning-button, E'. There are sufficient spaces between each top piece, E, and the corresponding plate D to allow the springs to be drawn through by a gentle force, when required. The ridge form of each plate D insures that each spring shall lie firmly upon it at that point. The top piece, E, is made with a beveled slot, which exposes the proper points A* in the springs to be conveniently soldered by hand or by any suitable machinery. The mechanism which draws the springs forward through the soldering clamps at proper times and to the proper extent may be turned at the proper intervals by machinery, but for small operations it may be worked by hand, and is so represented.

G G are rollers mounted in fixed bearings, one being provided with a hand-crank, $g$, by which it is turned. G' is a roller pressing thereon by the force of a weight, $G^2$, suspended to its extended axis. A pulley (shown in dotted lines and marked $G^3$) is fixed on the shaft of one of the rollers G, and gives motion through a round belt (shown in dotted lines and marked H) to a pulley (shown in dotted lines and marked I') fixed on a feathered shaft, I. This shaft carries a number of reels, J, side by side, which are frictionally connected to the shaft I through the aid of intermediate plates, (not shown,) which engage in the spline in the shaft I and are compelled to turn therewith. The parts are so proportioned that the shaft I tends to turn the reels faster than the springs are delivered. This keeps a sufficient tension on the several springs, and they are wound properly on their several reels.

The operation of this apparatus will now be readily understood. The several springs are soldered at the several points A*, where they cross the ridges of the several plates D, the solder filling the spaces between the braided wires and extending along the length of the spring a quarter of an inch, more or less. When all the points A* are soldered, the attendant takes hold of the crank, (shown in dotted lines and marked $g$,) and through it gives motion to the rolls G G', and also to the take-up shaft I and the connected reels J. This moves the several springs A endwise through the several guides and soldering-clamps, and when the last soldered points A* have reached a mark or gage (not represented) the crank $g$ must be released. The springs stop, each exposing the proper points in the several clamps to be soldered. This operation is repeated until the several springs are all soldered at the proper points and wound on their several reels J.

The next operation is to cut off the several lengths of springs, which may be effected by suitable stout shears, (not shown,) taking care to cut through each soldered point A*. This leaves the springs of the proper length, but tends to make the ends sharp-cornered. I finish each end of each spring by applying a metal cap, B. In my experiments I have used what are known as "open caps." They are forced on by hand or otherwise, and are afterward compressed in place, so as to take firm hold of the soldered surface within, not only by friction but by a sort of interlocking action due to the corrugations on the dies, which imprint themselves in the flat faces of the clamp, and also, to some extent, in the solder and wire within.

Modifications may be made in some of the details without departing from the principle of the invention or sacrificing all the advantages thereof. Instead of setting the several plates at uniform distances apart, they may be at variable distances, and the springs produced will correspondingly vary in length, taking care to properly separate the springs at the time when they are cut apart or at some later period. Where a great number of springs are required of certain length—as in the corset business—the soldering-plates may be fixed immovably on the bench. Machinery may be applied to turn the rollers G G'. One soldering-clamp alone may be used with success. Only one length of spring may be led through the clamp; but I prefer to guide through the apparatus a considerable number of lengths of spring at once, and to effect the soldering in several clamps, and thus allow a greater extent of motion when the springs are moved forward. Several workmen may attend to the soldering, each soldering the springs in one clamp, or in two clamps nearest to him. The distances of the soldering-clamps apart may be graduated with any degree of nicety by means of clamping-screws engaging in long slots instead of the holes.

I have used successfully hard brass wire of No. 26 gage, with the caps B made from softer brass—No. 30.

The peculiarities of the spring, and of the means for setting the caps thereon, as represented by Figs. 1, 1ª, 2, 3, 3ª, and 4, will be made the subject of other applications for patent.

I claim as my invention—

1. The soldering-clamp described, composed of the base-plate D, guides D' D², top piece, E, and holding means E', combined and adapted to serve as herein specified.

2. The combination of a series of soldering-clamps, D E, with retarding-rollers N N, impelling-rollers G G', and means for operating the latter, and a take-up device, J, with means for operating it, all adapted to serve as herein specified.

3. The herein-described method of manufacturing braided-wire springs, consisting in braiding the material in extended lengths, soldering at suitable intervals, and cutting through the soldered portions, substantially as described and set forth.

In testimony whereof I have hereunto set my hand, at New York city, New York, this 12th day of February, 1880, in the presence of two subscribing witnesses.

NICHOLAS JENKINS.

Witnesses:
WILLIAM C. DEY,
CHARLES C. STETSON.